United States Patent
Tarng et al.

(10) Patent No.: US 12,462,367 B2
(45) Date of Patent: Nov. 4, 2025

(54) DEFECT DETECTION METHOD AND TERMINAL DEVICE

(71) Applicant: Fulian Precision Electronics (Tianjin) Co., LTD., Tianjin (CN)

(72) Inventors: Wan-Hsin Tarng, New Taipei (TW); Cheng-Ju Yang, Taipei (TW); Tsai-Ping Chu, New Taipei (TW)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 369 days.

(21) Appl. No.: 18/140,588

(22) Filed: Apr. 27, 2023

(65) Prior Publication Data

US 2024/0095900 A1 Mar. 21, 2024

(30) Foreign Application Priority Data

Sep. 16, 2022 (CN) .......................... 202211129065.7

(51) Int. Cl.
*G06T 7/00* (2017.01)
*B23K 37/00* (2006.01)
(Continued)

(52) U.S. Cl.
CPC ............ *G06T 7/0004* (2013.01); *B23K 37/00* (2013.01); *G06T 7/136* (2017.01); *G06T 7/194* (2017.01);
(Continued)

(58) Field of Classification Search
CPC ....... G06T 7/0004; G06T 7/136; G06T 7/194; G06T 2207/30141; G06T 2207/30152;
(Continued)

(56) References Cited

U.S. PATENT DOCUMENTS 11,029,260 B2  6/2021  Xia et al.
11,580,758 B2  2/2023  Yang et al.
(Continued)

FOREIGN PATENT DOCUMENTS

CN    113820329 A    12/2021
CN    114078109 A    2/2022
(Continued)

OTHER PUBLICATIONS

Qi, M., Yin, T., Cheng, G., Xu, Y., Meng, H., Wang, Y., & Cui, S. (2022). Research on printing defects inspection of solder paste images. Wireless Communications and Mobile Computing, 2022(1), 8651956. (Year: 2022).*

*Primary Examiner* — Molly Wilburn
*Assistant Examiner* — Vaisali Rao Koppolu
(74) *Attorney, Agent, or Firm* — ScienBiziP, P.C.

(57) ABSTRACT

A defect detection method includes: obtaining an image of a first defective block output by the SPI machine; wherein the first defective block is a solder paste block that is not qualified for printing after being detected by the SPI machine; processing the image of the first defective block; detecting whether solder paste printing in the first defective block is qualified; and determining that the first defective block is a second defective block and determining a defect type of the first defective block when the solder paste printing of the first defective block is not qualified. A terminal device and a non-volatile storage medium therein, for performing the above-described method, are also disclosed.

11 Claims, 5 Drawing Sheets

(51) Int. Cl.
*G06T 7/136* (2017.01)
*G06T 7/194* (2017.01)

(52) U.S. Cl.
CPC ............... *G06T 2207/30141* (2013.01); *G06T 2207/30152* (2013.01)

(58) Field of Classification Search
CPC ........ B23K 37/00; B23K 1/0016; B23K 1/20; B23K 31/125
See application file for complete search history.

(56) References Cited

U.S. PATENT DOCUMENTS

| | | | |
|---|---|---|---|
| 2019/0200494 A1* | 6/2019 | Kim | B41F 33/0036 |
| 2019/0364707 A1* | 11/2019 | Futamura | G06T 7/0006 |
| 2020/0292471 A1* | 9/2020 | Xia | G06T 7/001 |
| 2021/0142456 A1* | 5/2021 | Varga | G06T 1/20 |
| 2021/0357693 A1* | 11/2021 | Kim | G06F 18/2148 |
| 2023/0029470 A1* | 2/2023 | Suzuki | G01N 21/956 |

FOREIGN PATENT DOCUMENTS

| | | | |
|---|---|---|---|
| CN | 117173079 A | * | 12/2023 |
| TW | 202036353 A | | 10/2020 |

* cited by examiner

DEFECT DETECTION METHOD AND TERMINAL DEVICE

FIELD

The present disclosure relates to the technical field of defect detection, in particular to a defect detection method and a terminal device.

BACKGROUND

Solder paste inspection (SPI) procedure is an important step in surface mount technology (SMT) process. The SPI uses the optical image detection system to compare the image of the object to be measured with a standard image, and measures the printing quantity, height, volume and area of solder paste to check whether the printing quality of solder paste meets the standard image. The image algorithm of the SPI machine is relatively traditional, and its accuracy is not high. During the production process, the SPI machine engineers will set the detection standard for each object to be tested. If the set detection standard is too high, the product line will have a high kill rate. If the set detection standard is too low, detection of faulty product may be missed. The defective products detected by the SPI need to be further re judged by manual visual inspection, and the quality of products will be classified according to the results of manual re-judgment. When the over-kill rate of the product line is too high, a lot of manual inspection is required, which consumes a lot of manpower and time, and the production efficiency is low.

Therefore, improvement is desired.

DETAILED DESCRIPTION

In the embodiment of the present disclosure, words such as "first" and "second" are only used to distinguish different objects and cannot be understood as indicating or implying relative importance or indicating or implying order. For example, the first application, the second application, and the like are used to distinguish different applications, not to describe the specific order of applications. The features defined as "first" and "second" can explicitly or implicitly include one or more of these features.

In the description of the embodiments of the present disclosure, the words "exemplary" or "for example" are used as examples, examples or descriptions. Any embodiment or design scheme described as "exemplary" or "for example" in the embodiments of the present disclosure shall not be interpreted as more preferred or advantageous than other embodiments or designs. Specifically, the use of words such as "exemplary" or "for example" is intended to present relevant concepts in a specific way.

When surface mount technology (SMT) is used to produce printed circuit board (PCB), the solder paste should be printed on the position where the components need to be welded on the PCB, and then the solder paste on the PCB should be tested through solder paste inspection (SPI) to check whether the solder paste is qualified. If the solder paste on the PCB is qualified, it is determined that the PCB is qualified. If the solder paste on the PCB is unqualified, it is determined that the PCB is defective.

It can be understood that unqualified solder paste printing includes insufficient printing area, excessive printing area and deviation of printing position. In order to ensure the quality of products in the production process, the detection standard of SPI machines is often set higher, which leads to a higher rate of over-kill of the product.

In order to solve the above problems, the present disclosure provides a defect detection method and system, the present disclosure can re-judge the products identified as defective products, further detect the products with unqualified solder paste printing from the defective products and determine the defect type of the products with unqualified solder paste printing, so as to reduce the over-kill rate of the products and improve production efficiency.

Figure 1:
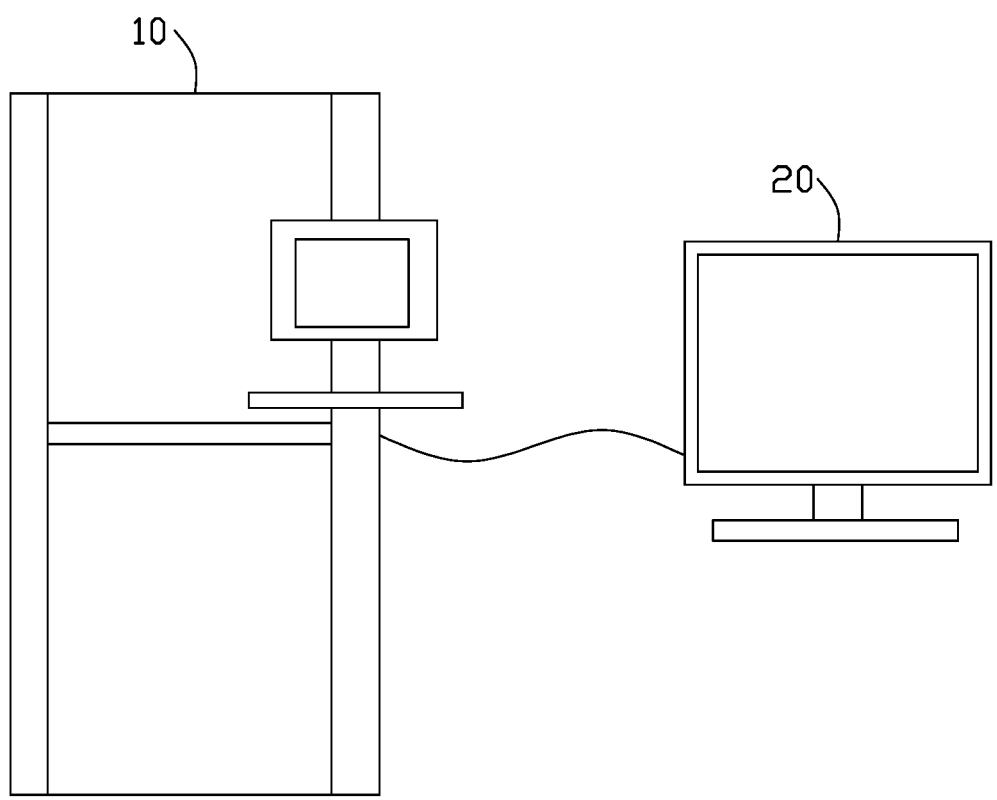
FIG. 1 is a schematic diagram of a defect detection system according to an embodiment of the present disclosure.

FIG. 1 illustrates a defect detection system 1 in accordance with an embodiment of the present disclosure.

The defect detection system 1 includes a SPI machine 10 and a terminal device 20, and the SPI machine 10 establishes a communication connection with the terminal device 20. In some embodiments, the terminal device 20 may be a computer.

The SPI machine 10 is used to obtain the solder paste image of the product and carry out the initial inspection of the solder paste image of the product to determine whether the solder paste printing of the product is qualified. The product can include multiple solder paste blocks, the solder paste image of the product can include multiple solder paste blocks, and the SPI machine 10 needs to detect every solder paste block in the product. If the solder paste printing in the solder paste block is detected to be qualified, the solder paste block is determined to be the first qualified block. If the solder paste printing in the solder paste block is detected to be unqualified, the solder paste block is determined to be the first defective block.

The terminal device 20 is used to obtain the image of the first defective block from the SPI machine 10 and recheck the image of the first defective block to further determine whether the solder paste printing of the first defective block is qualified. If the solder paste printing of the first defective block is detected to be qualified, the first defective block is determined to be the second qualified block. If the solder paste printing of the first defective block is detected to be unqualified, the first defective block is determined to be the second defective block, and the defect type of the second defective block is determined.

Figure 2:
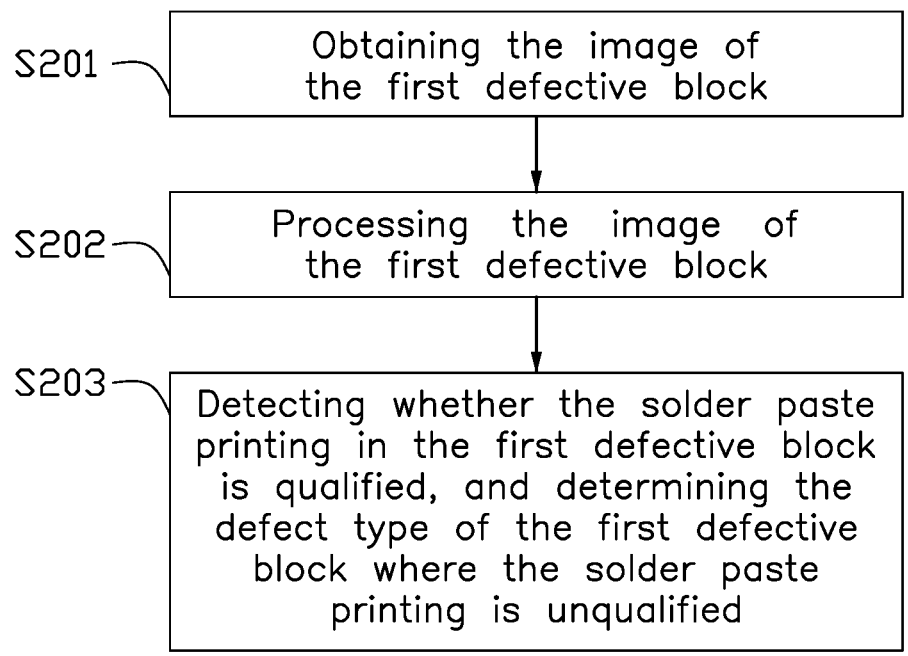
FIG. 2 is a flowchart of a defect detection method according to another embodiment of the present disclosure.

FIG. 2 is a flowchart of a defect detection method in accordance with an embodiment of the present disclosure. The defect detection method may include the following steps:

At step S201, obtaining the image of the first defective block.

The terminal device 20 can obtain the image of the first defective block output by the SPI machine 10.

For example, the SPI machine 10 is used to obtain the solder paste image of the product and carry out the initial inspection of the solder paste image of the product to determine whether the solder paste printing of the product is qualified. The product can include multiple solder paste blocks, the solder paste image of the product can include multiple solder paste blocks, and the SPI machine 10 needs to detect every solder paste block in the product. If the solder paste printing in the solder paste block is detected to be qualified, the solder paste block is determined to be the first qualified block. If the solder paste printing in the solder paste block is detected to be unqualified, the solder paste block is determined to be the first defective block.

In some embodiments, when the SPI machine 10 detects that the solder paste block in the solder paste image is clear and free of foreign objects, the solder pad is not significantly exposed, and the tin content does not obviously exceed the detection area, the solder paste image is determined to be the first qualified block. When SPI machine 10 detects that the solder paste block area in the solder paste image is insufficient, or the area exceeds the standard, or the solder paste position deviates from the detection area, or the solder paste blocks are connected, or there is foreign object in the detection area, the solder paste block in the solder paste image is determined to be the first defective block.

It can be understood that the detection area of the solder paste block in the solder paste image of the SPI machine 10 can be set according to the production demand.

At step S202, processing the image of the first defective block.

After receiving the image of the first defective block, the terminal device 20 processes the image of the first defective block to make the solder paste in the image of the first defective block clearer and convenient for subsequent detection.

At step S203, detecting whether the solder paste printing in the first defective block is qualified, and determining the defect type of the first defective block where the solder paste printing is unqualified.

In the embodiment, the terminal device 20 processes the image of the first defective block, and then detects the processed image of the first defective block to further determine whether the solder paste printing in the first defective block is qualified. If the solder paste printing of the first defective block is detected to be qualified, the first defective block is determined to be the second qualified block; if the solder paste printing of the first defective block is detected to be not qualified, the first defective block is determined to be the second defective block, and the defect type of the second defective block is determined.

Figure 3:
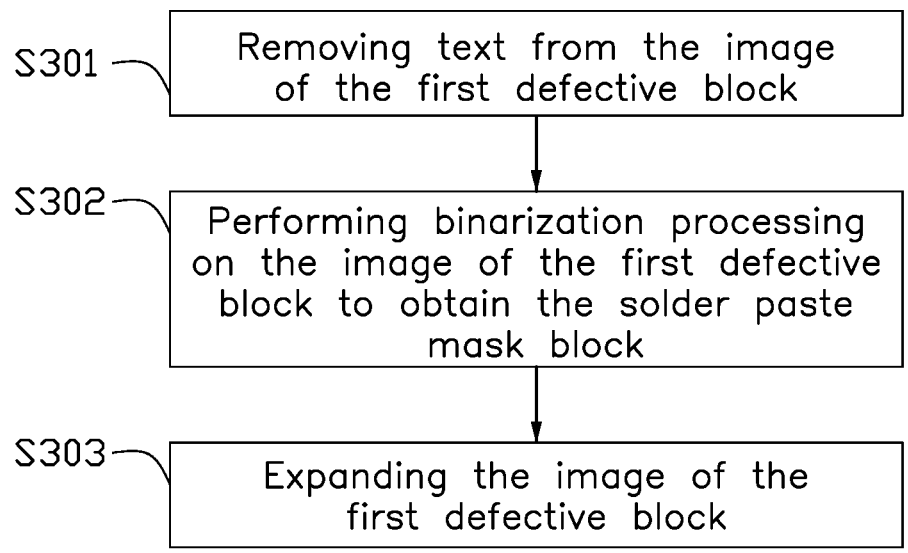
FIG. 3 is a flowchart of a defect detection method according to another embodiment of the present disclosure.

Referring to FIG. 3, in some embodiment, step S202 can include the following steps.

At step S301, removing text from the image of the first defective block.

In some embodiments, the printed circuit board (PCB) is printed with text or other marks, and when the image of the first defective block contains text or other marks, a binary method is used to remove the text or marks from the image of the first defective block to avoid interference with subsequent detection.

At step S302, performing binarization processing on the image of the first defective block to obtain the solder paste mask block.

In some embodiments, the terminal device 20 selects corresponding color parameters in the HLS space of the image of the first defective block, performs binarization processing on the image of the first defective block, and divides the image of the first defective block into a foreground region and a background region. The solder paste in the image of the first defective block is the foreground area, and the other parts of the image of the first defective block are the background area. The terminal device 20 extracts effective pixels formed by the solder paste in the image of the first defective block, so that the solder paste in the first defective block can form a solder paste mask block.

At step S303, expanding the image of the first defective block.

In some embodiments, after the terminal device 20 binarizes the solder paste image, there may be gaps in the solder paste mask block, the terminal device 20 further performs expansion processing on the image of the first defective block, which means that the terminal device 20 fills the gaps in the solder paste mask block to make the solder paste mask block fuller and clearer.

Figure 4:
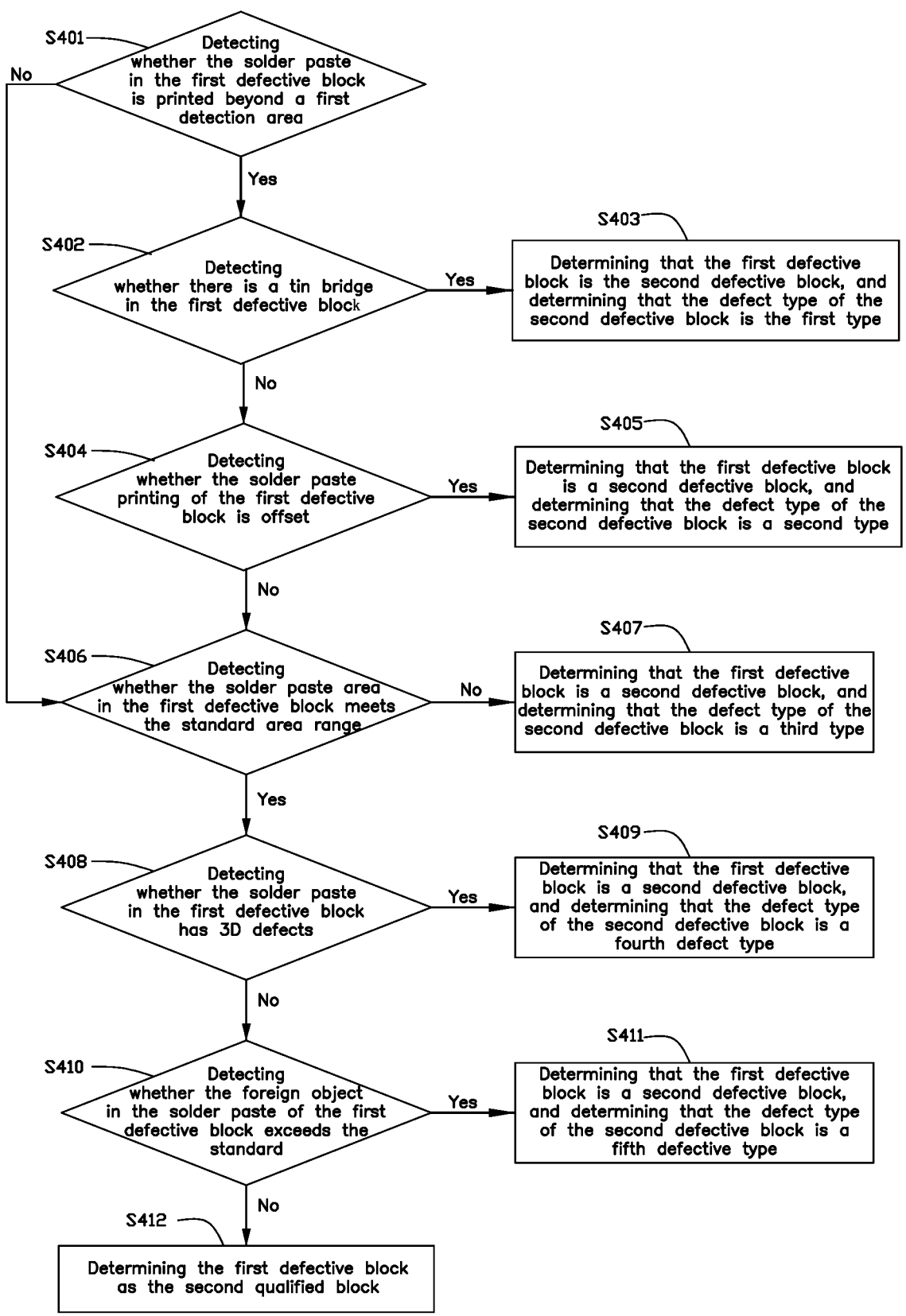
FIG. 4 is a flowchart of a defect detection method according to another embodiment of the present disclosure.

Referring to FIG. 4, in some embodiments, step S203 can include the following steps.

At step S401, detecting whether the solder paste in the first defective block is printed beyond a first detection area.

In the embodiment, after processing the image of the first defective block, the terminal device 20 detects whether the solder paste in the image of the first defective block is printed beyond the first detection area. In some embodiments, the first detection area for solder paste printing can be set according to production requirements.

When the terminal device 20 detects that the solder paste printing in the image of the first defective block exceeds the first detection area, for example, the terminal device 20 detects that the solder paste printing in the first defective block exceeds the first detection area, step S402 is executed.

When the terminal device 20 detects that the solder paste printing in the image of the first defective block does not exceed the first detection area, for example, the terminal device 20 detects that the solder paste printing in the first defective block does not exceed the first detection area, step S406 is executed.

At step S402, detecting whether there is a tin bridge in the first defective block. If there is a tin bridge in the first defective block, step S403 is implement, otherwise, step S404 is implement.

In the embodiment, the terminal device 20 performs connectivity area analysis on the image of the first defective block. The connectivity area is a collection of adjacent pixels with the same pixel value, and then the connectivity area analysis is completed by marking each connectivity area differently. It can be understood that the solder paste in the image of each first defective block is an adjacent pixel with the same pixel value, and then the terminal device 20 marks the solder paste in the image of each first defective block differently. If the image of any first defective block contains the same marker as the image of another first defective block, the solder paste in the first defective block is connected to the solder paste in another first defective block, that is, there is a tin bridge in the first defective block.

At step S403, determining that the first defective block is the second defective block, and determining that the defect type of the second defective block is the first type.

When the terminal device 20 detects that there is a tin bridge in the solder paste in the first defective block, the first defective block is determined to be the second defective block, and the defect type of the second defective block is determined to be the first defect type, that is, there is a tin bridge in the first defective block.

At step S404, detecting whether the solder paste printing of the first defective block is offset. If the solder paste printing of the first defective block is offset, step S405 is implement, otherwise step S406.

When the terminal device 20 detects that there is no tin bridge in the first defective block, the first detection area is reduced by a first ratio (30%-70%) to obtain a second detection area, the terminal device 20 detects whether the solder paste in the first defective block has a coverage rate greater than or equal to the standard coverage rate in the second detection area to detect whether the solder paste printing in the first defective block is offset.

When the terminal device 20 detects that the coverage rate of the solder paste in the first defective block within the second detection area is less than the standard coverage rate, step S405 is executed.

When the terminal device 20 detects that the coverage rate of the solder paste in the first defective block within the second detection area is greater than or equal to the standard coverage rate, that is, it detects that the solder paste printing in the first defective block is not offset, and step S406 is executed.

At step S405, determining that the first defective block is a second defective block, and determining that the defect type of the second defective block is a second type.

When the terminal device 20 detects that the coverage rate of the solder paste in the first defective block within the second detection area is less than the standard coverage rate, that is, it detects that the solder paste printing in the first defective block is offset, and the terminal device 20 determines that the first defective block is the second defective block, and determines that the defect type of the second defective block is the second defect type, that is, the solder paste printing is offset.

At step S406, detecting whether the solder paste area in the first defective block meets the standard area range. If the solder paste area in the first defective block meets the standard area range, step S408 is implement, otherwise step S407 is implement.

When the terminal device 20 detects that the solder paste printing in the image of the first defective block is not offset, it further detects whether the solder paste area in the image of the first defective block meets the standard range within the first detection area, that is, the terminal device 20 detects whether the solder paste area in the image of the first defective block is within the standard range.

When the terminal device 20 detects that the solder paste area in the image of the first defective block does not meet the standard area range, that is, the solder paste area in the first defective block is detected to be not meet the standard area range, and step S407 is executed.

When the terminal device 20 detects that the solder paste area in the image of the first defective block meets the standard area range, that is, the solder paste area of the first defective block is detected to be within the standard area range, step S408 is executed.

At step S407, determining that the first defective block is a second defective block, and determining that the defect type of the second defective block is a third type.

When the terminal device 20 detects that the solder paste area in the first defective block does not meet the standard area range, that is, the solder paste area in the first defective block is not within the standard area range, the first defective block is determined to be a second defective block, the defect type is determined to be a third defective type, that is, the solder paste area does not meet the standard area range.

In some embodiments, when the terminal device 20 detects that the solder paste area of the first defective block is greater than the maximum value of the standard area range, the first defective block is determined to be a second defective block, and the solder paste area of the second defective block is determined to exceed the standard. When the terminal device 20 detects that the solder paste area of the first defective block is less than the minimum value of the standard area range, the first defective block is determined to be a second defective block, and the solder paste area of the second defective block is determined to be insufficient.

At step S408, detecting whether the solder paste in the first defective block has 3D defects. If the solder paste in the first defective block has 3D defects, step S409 is implement, otherwise step S410 is implement.

When the terminal device 20 detects that the solder paste area in the first defective block meets the standard area range, it further detects whether the solder paste in the first defective block has 3D defects. The terminal device 20 can detect the height and volume of the solder paste in the first defective block to detect whether there are 3D defects in the solder paste in the first defective block.

When the terminal device 20 detects that the solder paste in the image of the first defective block does not have 3D defects, that is, when it detects that the solder paste in the first defective block does not have 3D defects, step S410 is executed.

When the terminal device 20 detects a 3D defect in the solder paste in the image of the first defective block, that is, it detects a 3D defect in the solder paste of the first defective block, that is, it detects that the solder paste height of the first defective block does not meet the standard height range, and that the solder paste volume of the first defective block does not meet the standard volume range, step S409 is executed.

At step S409, determining that the first defective block is a second defective block, and determining that the defect type of the second defective block is a fourth defect type.

In some embodiments, when the terminal device 20 detects the solder paste in the first defective block has 3D defects, that is, the solder paste height of the first defective block does not meet the standard height range and/or the solder paste volume of the first defective block does not meet the standard volume range, the terminal device 20 determines that the first defective block is a second defective block, and determines that the defect type of the first defective block is a fourth defect type, that is, the solder paste has a 3D defect.

At step S410, detecting whether the foreign object in the solder paste of the first defective block exceeds the standard. If the foreign object in the solder paste of the first defective block exceeds the standard, step S411 is implement, otherwise step S412 is implement.

When the terminal device 20 detects that the solder paste of the first defective block does not have 3D defects, it further detects whether the foreign object in the solder paste of the first defective block exceeds the standard. For example, the terminal device 20 selects corresponding color parameters in the HLS space of the image of the first defective block to capture foreign object blocks in the image of the first defective block by comparing the colors of solder paste in the image of the first defective block. When the foreign object blocks in the image of the first defective block is captured, the terminal device 20 can amplify the first detection area at a second ratio (100%-150%) to obtain a third detection area and detect whether the number of pixel points in the foreign object block in the third detection area is greater than a standard value.

When the terminal device 20 detects that the number of pixel points in the foreign object block in the third detection area is greater than the standard value, and the foreign object in the solder paste of the first defective block exceeds the standard, step S411 is executed.

When the terminal device 20 detects that the number of pixel points in the foreign object block in the third detection area is less than or equal to the standard value, and the foreign object in the solder paste of the first defective block does not exceed the standard, step S412 is executed.

At step S411, determining that the first defective block is a second defective block, and determining that the defect type of the second defective block is a fifth defective type.

In some embodiments, when the terminal device 20 detects that the number of pixel points in the foreign object block in the third detection area is greater than the standard value, that is, the foreign object in the solder paste of the first defective block exceeds the standard, and the first defective block is determined to be the second defective block, and the defect type of the second defective block is determined to be the fifth defective type, that is, the foreign object in the solder paste exceeds the standard.

At step S412, determining the first defective block as the second qualified block.

In some embodiments, when the terminal device 20 detects that the number of pixel points in the foreign object block in the third detection area is less than or equal to the standard value, that is, the foreign object in the solder paste of the first defective block does not exceed the standard, thereby determining that the first defective block is the second qualified block.

In some embodiments, the second qualified block is the solder paste with qualified printing in the first defective block. Specifically, the solder paste in the second qualified block is not printed offset, the area of the solder paste meets the standard area range, and there are no tin bridges and 3D defects in the solder paste, as well as foreign object.

The present disclosure implements all or part of the processes in the methods of the above embodiments and can also be completed by instructing related hardware through a computer program that can be stored in a computer-readable storage medium. When the computer program is executed by a processor, it can implement the steps of each of the above method embodiments. The computer program includes computer program code, which can be in the form of source code, object code, executable files, or some intermediate form. The computer-readable medium may include any entity or device capable of carrying the computer program code, recording medium, USB flash drives, removable hard disks, magnetic disks, optical disks, computer memory, read-only memory (ROM), and random-access memory (RAM).

Figure 5:
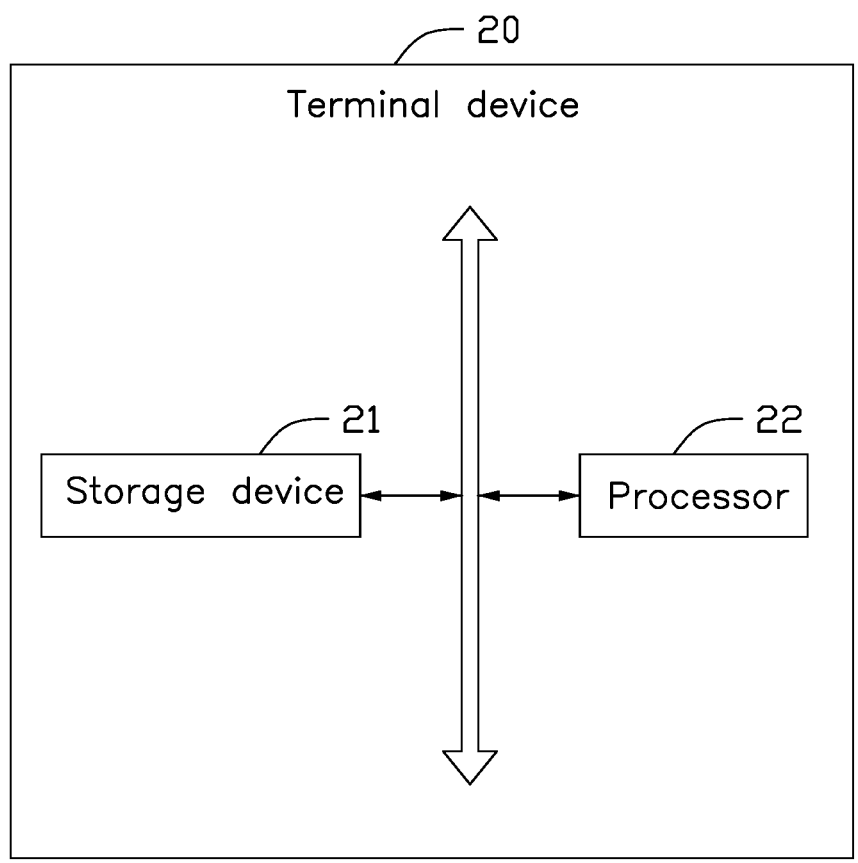
FIG. 5 is a schematic diagram of a terminal device according to an embodiment of the present disclosure.

FIG. 5 illustrates a terminal device 20 in accordance with another embodiment of the present disclosure.

In one embodiment, the terminal device 20 includes a storage device 21 and at least one processor 22. Those skilled in the art should understand that the structure of the terminal device 20 shown in FIG. 5 does not constitute a limitation of the present disclosure. The terminal device 20 may also include other components.

In some embodiments, the terminal device 20 includes a terminal capable of automatically performing numerical calculations and/or information processing in accordance with previously set or stored instructions, and its hardware includes, but is not limited to, microprocessors, application specific integrated circuits, programmable gate arrays, digital processors, and embedded devices. In some embodiments, the storage device 21 is used to store program code and various data. The storage device 21 can include read-only memory (ROM), random access memory (RAM), programmable read-only memory (PROM), erasable programmable read-only memory (EPROM), one time programmable read-only memory (OTPROM), electrically erasable programmable read only memory (EEPROM), compact disc read only memory (CD-ROM), or other optical disk storage, disk storage, magnetic tape storage, or any other computer-readable medium that can be used to carry or store data.

In some embodiments, the at least one processor 22 may include integrated circuits, such as a single packaged integrated circuit, or multiple integrated circuits with the same or different functional packages, including microprocessors, digital processing chips, graphics processors, and combinations of various control chips. The at least one processor 22 is the control unit of the controller, which executes various functions and processes data of the terminal device 20 by running or executing programs or modules stored in the storage device 21, and invoking data stored in the storage device 21. The storage device 21 stores program code, and the at least one processor 22 can call the program code stored in the storage device 21 to perform related functions. In an embodiment of the present disclosure, the storage device 21 stores a plurality of instructions that are executed by the at least one processor 22 to implement the defect detection method. Specifically, the specific implementation method of the above instructions by the at least one processor 22 can be described with reference to the relevant steps in the corresponding embodiment in FIGS. 2-4 and will not be discussed here.

It is understood that the specific implementation of the terminal device 20 can be seen in the above embodiments and will not be discussed here.

The embodiment of the present disclosure also provides a storage medium. The storage medium stores computer instructions that, when run on a computing device, enable the computing device to execute the defect detection method provided by the embodiments.

In the embodiment of the present disclosure, taking the detection of 2340 first defective blocks using the above defect detection method as an example, the detection effect of the above detection method is introduced.

The standard result obtained after the 2340 first defective blocks have been manually detected is 228 second qualified blocks and 2112 second defective blocks. After the defect detection method described above, the experimental results obtained include 192 second qualified blocks and 2248 second defective blocks, the second qualified blocks in the experimental results are all the second qualified blocks in the standard results. The second defective block in the experimental result is 36 more than the second defective block in the standard result.

The defect detection method described above has a missed detection rate of 0%, overkill rate of 15.8%, overkill reduction rate of 84.2%, and a visual inspection reduction rate of 8.2%. Therefore, applying the above defect detection system and method to the SMT production line can improve the high kill rate of SPI machines, reduce the time required for manual visual inspection, and reduce the frequency of machine engineers adjusting SPI machine parameters, improve production line productivity, and reduce labor requirements.

The defect detection method of the present disclosure can re-judge the products identified as defective products, further detect the products with unqualified solder paste printing from the defective products and determine the defect type of the products with unqualified solder paste printing, so as to reduce the over-kill rate of the products and improve production efficiency.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A defect detection method applied to a terminal device, the terminal device communicable with a solder paste inspection (SPI) machine, the defect detection method comprising:
obtaining an image of a first defective block output by the SPI machine; wherein the first defective block is a solder paste block that is not qualified for printing after being detected by the SPI machine;
performing binarization processing on the image of the first defective block to obtain a solder paste mask block and expanding the image of the first defective block to fill a gap in the solder paste mask block;
detecting whether solder paste printing in the first defective block is qualified;
determining that the first defective block is a second defective block and determining a defect type of the first defective block when the solder paste printing of the first defective block is not qualified;
detecting whether the solder paste printing in the first defective block is outside a boundary of a first detection area; detecting whether there is a tin bridge in the first defective block when the solder paste printing in the first defective block is outside the boundary of the first detection area; detecting whether a solder paste area in the first defective block meets a standard area range when the solder paste printing in the first defective block is within the boundary of the first detection area;
determining that the first defective block is the second defective block, determining that the defect type of the second defective block is a first type when the tin bridge is detected in the first defective block, detecting whether the solder paste printing of the first defective block is offset when the tin bridge is not detected in the first defective block; and
detecting whether the solder paste printing in the first defective block is offset by detecting whether a coverage of a solder paste in the first defective block within a second detection area is greater than or equal to a standard coverage rate; wherein the second detection area is obtained by reducing the first detection area by a first ratio.

2. The defect detection method of claim 1, further comprising:
determining that the first defective block is the second defective block and determining that the defect type of the second defective block is a second type when the coverage of the solder paste in the first defective block within the second detection area is less than the standard coverage rate; and
detecting whether the solder paste area in the first defective block meets to the standard area range when the coverage of the solder paste in the first defective block within the second detection area is greater than or equal to the standard coverage rate.

3. The defect detection method of claim 2, further comprising:
detecting whether the solder paste area in the first defective block meets the standard area range;
determining that the first defective block is the second defective block and determining that the defect type of the second defective block is a third type when the solder paste area in the first defective block does not meet the standard area range; and
detecting whether the solder paste of the first defective block has three dimensional (3D) defects when the solder paste area in the first defective block meets the standard area range.

4. The defect detection method of claim 3, further comprising:
detecting whether a height of the solder paste of the first defective block meets a standard height range and whether a solder paste volume of the first defective block meets a standard volume range to detect whether the solder paste of the first defective block has the 3D defects;
determining the first defective block is the second defective block and determining the defect type of the second defective block is a fourth defective type when the height of the solder paste of the first defective block does not meet the standard height range, and/or the solder paste volume in the first defective block does not meet the standard volume range, and the solder paste of the first defective block have the 3D defects;
detecting whether foreign object in the solder paste of the first defective block exceeds a standard when the solder paste of the first defective block does not have 3D defects;
detecting whether a number of pixel points of the foreign object block in a third detection area is greater than a standard value, to detect whether the foreign object of the solder paste of the first defective block exceeds a standard; wherein the third detection area is obtained by amplifying the first detection area by a second ratio;
determining the first defective block is the second defective block and determining the defect type of the second defective block is the fifth defective type when the number of the pixel points of the foreign object block in the third detection area is greater than the standard value; and
determining the first defective block is a second qualified block when the number of the pixel points of the foreign object block in the third detection area is less than or equal to the standard value.

5. A terminal device comprising:
a storage device; and
at least one processor, wherein the storage device stores one or more programs, when executed by the at least one processor, the one or more programs cause the at least one processor to:
obtain an image of a first defective block output by the SPI machine; wherein the first defective block is a solder paste block that is not qualified for printing after being detected by the SPI machine;
perform binarization processing on the image of the first defective block to obtain a solder paste mask block and expand the image of the first defective block to fill a gap in the solder paste mask block;
detect whether solder paste printing in the first defective block is qualified; and
determine that the first defective block is a second defective block and determine a defect type of the first defective block when the solder paste printing of the first defective block is not qualified;
detect whether the solder paste printing in the first defective block is outside a boundary of a first detection area, detect whether there is a tin bridge in the first defective block when the solder paste printing in the first defective block is outside the boundary of the first detection area, and detect whether a solder paste area in the first defective block meets a standard area range when the solder paste printing in the first defective block is within the boundary of the first detection area;

determine that the first defective block is the second defective block, determine that the defect type of the second defective block is a first type when the tin bridge is detected in the first defective block, detect whether the solder paste printing of the first defective block is offset when the tin bridge is not detected in the first defective block; and detect whether the solder paste printing in the first defective block is offset by detecting whether a coverage of a solder paste in the first defective block within a second detection area is greater than or equal to a standard coverage rate; wherein the second detection area is obtained by reducing the first detection area by a first ratio.

6. The terminal device of claim 5, wherein the at least one processor is further caused to:

determine that the first defective block is the second defective block and determine that the defect type of the second defective block is a second type when the coverage of the solder paste in the first defective block within the second detection area is less than the standard coverage rate; and detect whether the solder paste area in the first defective block meets to the standard area range when the coverage of the solder paste in the first defective block within the second detection area is greater than or equal to the standard coverage rate.

7. The terminal device of claim 6, wherein the at least one processor is further caused to:

detect whether the solder paste area in the first defective block meets the standard area range;

determine that the first defective block is the second defective block and determine that the defect type of the second defective block is a third type when the solder paste area in the first defective block does not meet the standard area range; and detect whether the solder paste of the first defective block has three dimensional (3D) defects when the solder paste area in the first defective block meets the standard area range.

8. The terminal device of claim 7, wherein the at least one processor is further caused to:

detect whether a height of the solder paste of the first defective block meets a standard height range and whether a solder paste volume of the first defective block meets a standard volume range to detect whether the solder paste of the first defective block has the 3D defects;

determine the first defective block is the second defective block and determine the defect type of the second defective block is a fourth defective type when the height of the solder paste of the first defective block does not meet the standard height range, and/or the solder paste volume in the first defective block does not meet the standard volume range, and the solder paste of the first defective block have the 3D defects;

detect whether foreign object in the solder paste of the first defective block exceeds a standard when the solder paste of the first defective block does not have 3D defects;

detect whether a number of pixel points of the foreign object block in a third detection area is greater than a standard value, to detect whether the foreign object of the solder paste of the first defective block exceeds a standard; wherein the third detection area is obtained by amplifying the first detection area by a second ratio;

determine the first defective block is the second defective block and determine the defect type of the second defective block is the fifth defective type when the number of the pixel points of the foreign object block in the third detection area is greater than the standard value; and determine the first defective block is a second qualified block when the number of the pixel points of the foreign object block in the third detection area is less than or equal to the standard value.

9. A non-transitory storage medium having stored thereon instructions that, when executed by a processor of a computer device installed in a terminal device, causes the processor to perform a defect detection method, wherein the method comprises:

obtaining an image of a first defective block output by the SPI machine; wherein the first defective block is a solder paste block that is not qualified for printing after being detected by the SPI machine;

performing binarization processing on the image of the first defective block to obtain a solder paste mask block and expanding the image of the first defective block to fill a gap in the solder paste mask block;

detecting whether solder paste printing in the first defective block is qualified; and determining that the first defective block is a second defective block and determining a defect type of the first defective block when the solder paste printing of the first defective block is not qualified;

detecting whether the solder paste printing in the first defective block is outside a boundary of a first detection area; detecting whether there is a tin bridge in the first defective block when the solder paste printing in the first defective block is outside the boundary of the first detection area; detecting whether a solder paste area in the first defective block meets a standard area range when the solder paste printing in the first defective block is within the boundary of the first detection area;

determining that the first defective block is the second defective block, determining that the defect type of the second defective block is a first type when the tin bridge is detected in the first defective block; detecting whether the solder paste printing of the first defective block is offset when the tin bridge is not detected in the first defective block; and detecting whether the solder paste printing in the first defective block is offset by detecting whether a coverage of a solder paste in the first defective block within a second detection area is greater than or equal to a standard coverage rate; wherein the second detection area is obtained by reducing the first detection area by a first ratio.

10. The non-transitory storage medium of claim 9, further comprising:

determining that the first defective block is the second defective block and determining that the defect type of the second defective block is a second type when the coverage of the solder paste in the first defective block within the second detection area is less than the standard coverage rate; and detecting whether the solder paste area in the first defective block meets to the standard area range when the coverage of the solder paste in the first defective block within the second detection area is greater than or equal to the standard coverage rate.

11. The non-transitory storage medium of claim 10, further comprising:
   detecting whether the solder paste area in the first defective block meets the standard area range;
   determining that the first defective block is the second defective block and determining that the defect type of the second defective block is a third type when the solder paste area in the first defective block does not meet the standard area range; and
   detecting whether the solder paste of the first defective block has three dimensional (3D) defects when the solder paste area in the first defective block meets the standard area range.

* * * * *